July 30, 1963  V. S. JOHNSON  3,099,489
DUMP VEHICLE
Original Filed March 1, 1962  4 Sheets-Sheet 1
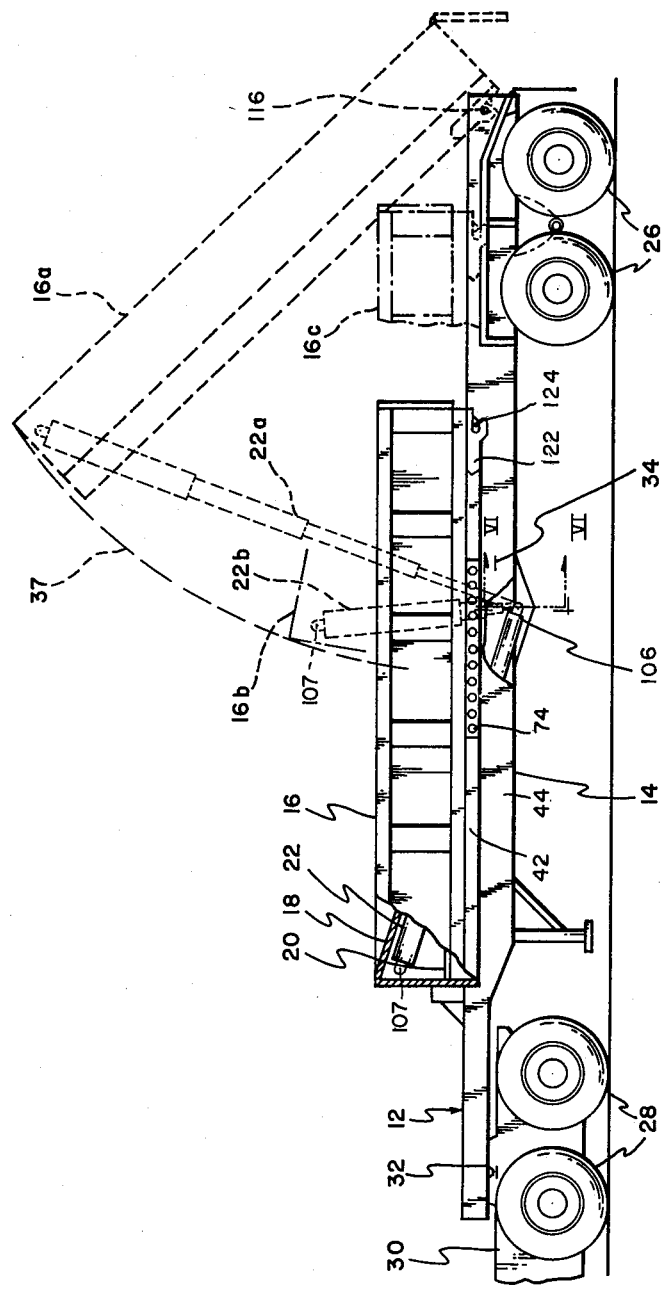
INVENTOR.
VELMO S. JOHNSON
BY
ATTORNEY

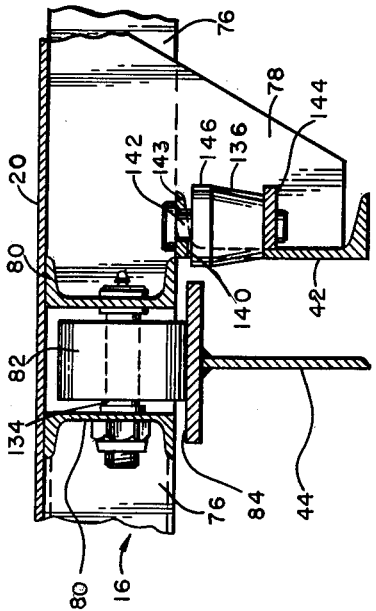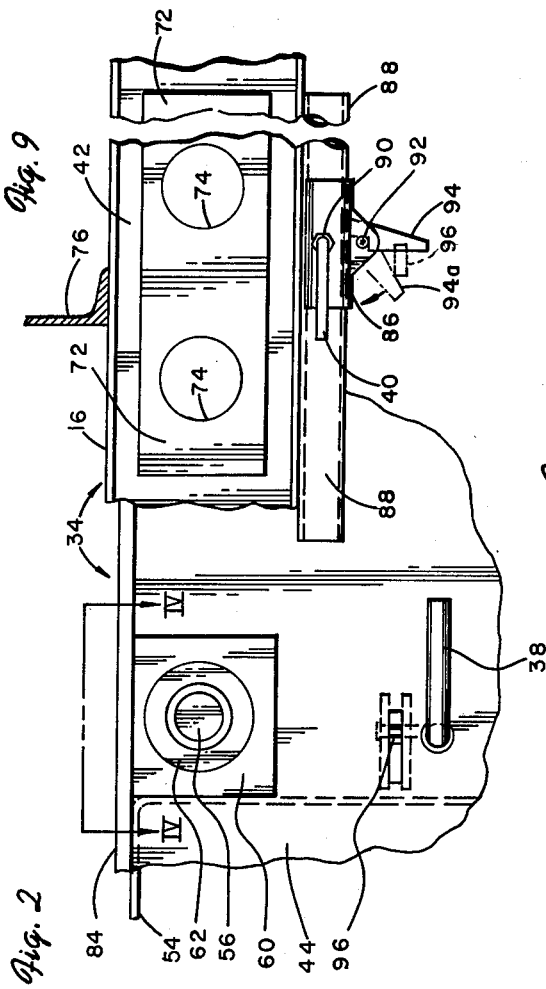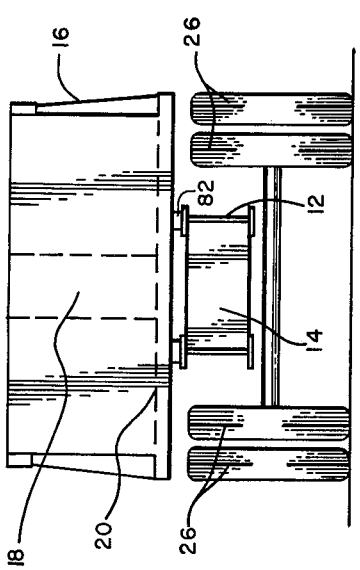

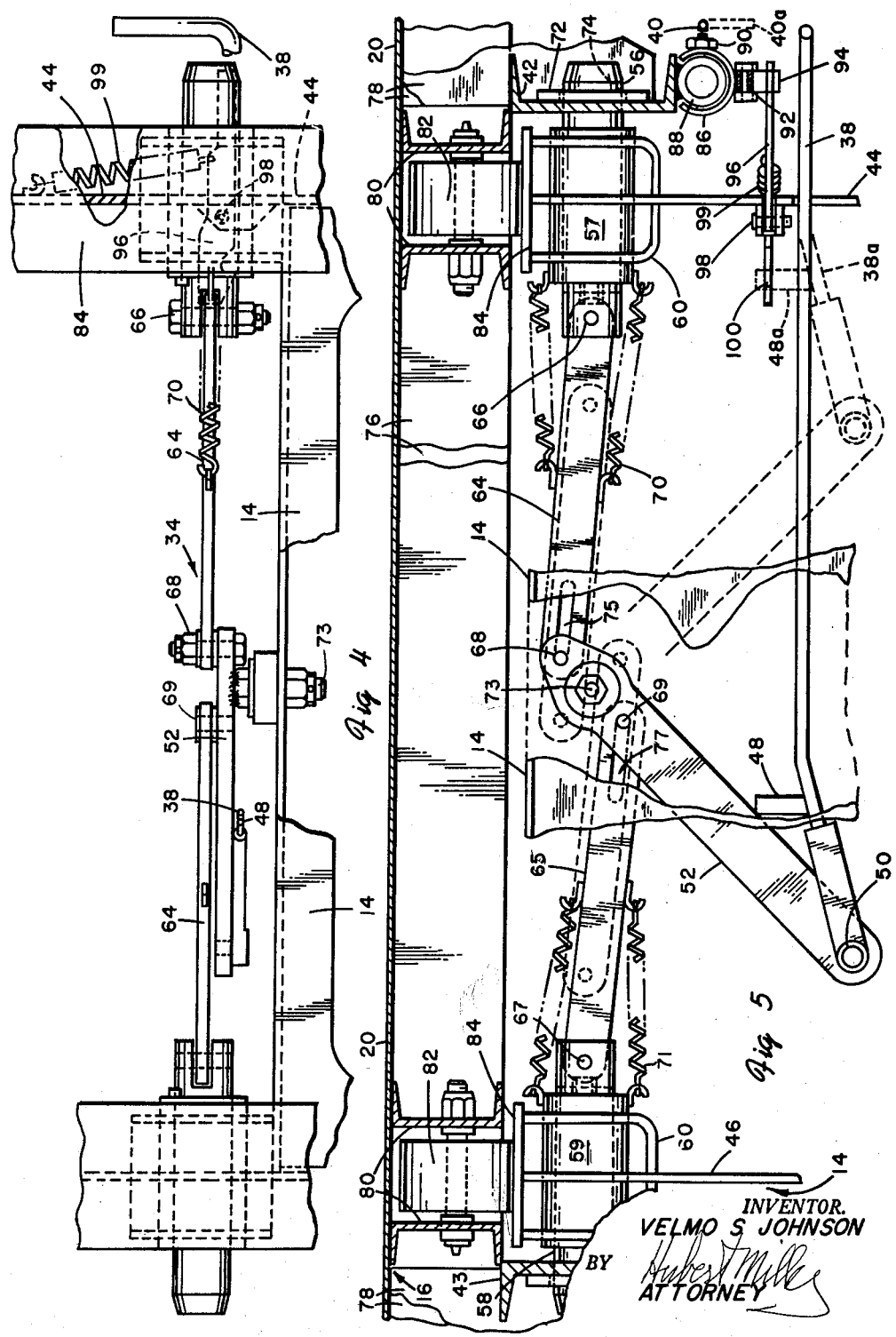

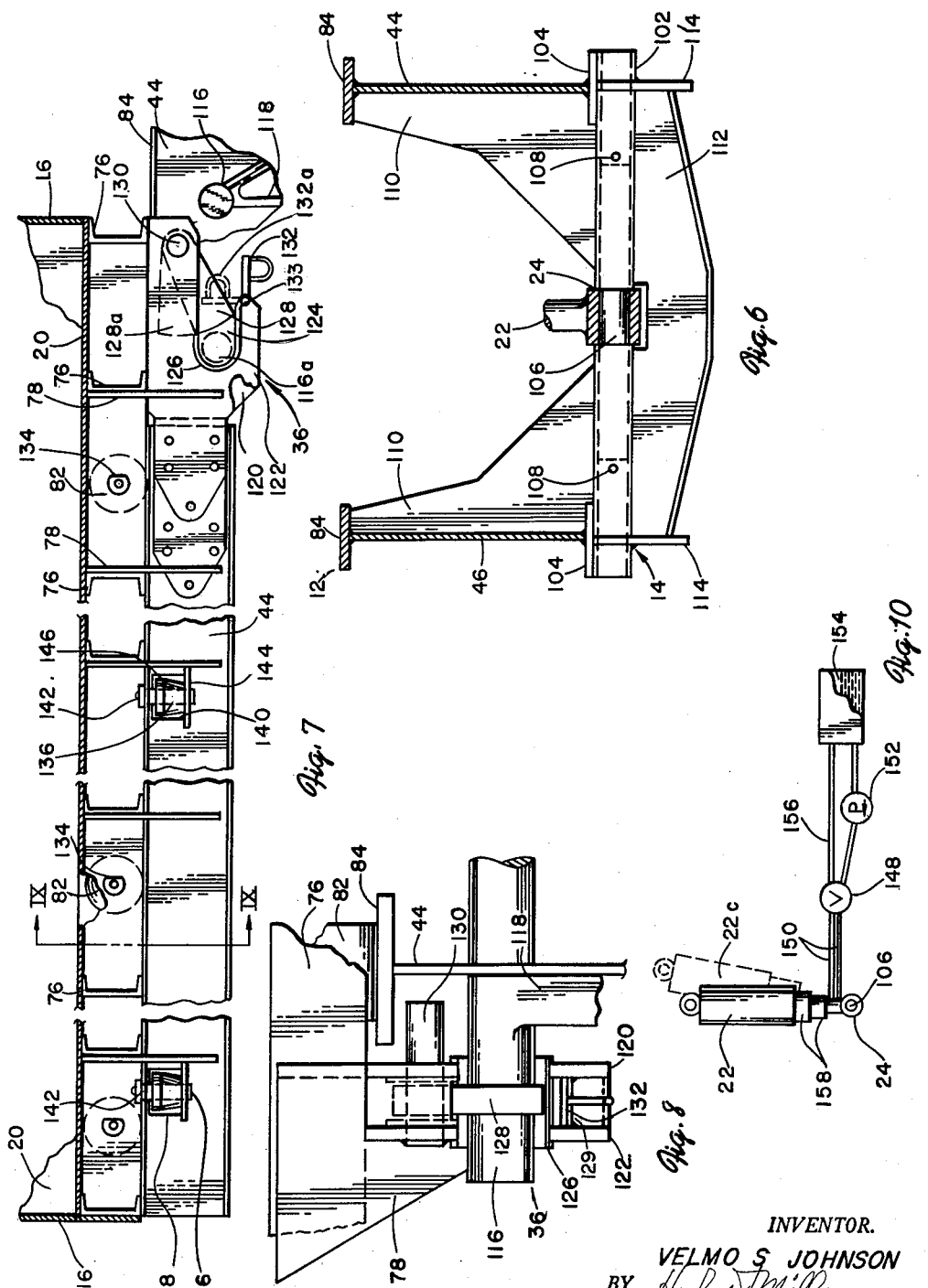

United States Patent Office 3,099,489
Patented July 30, 1963

3,099,489
DUMP VEHICLE
Velmo S. Johnson, Augusta, Kans., assignor to Spencer Safford Loadcraft, Inc., Augusta, Kans., a corporation of Kansas
Continuation of abandoned application Ser. No. 176,663, Mar. 1, 1962. This application Nov. 20, 1962, Ser. No. 242,035
6 Claims. (Cl. 298—14)

This is a continuing application and contains the same subject matter and is based on the disclosure contained in my co-pending application Serial Number 176,663 filed March 1, 1962, which is abandoned.

My invention relates generally to material hauling trucks, semi-trailers and the like, in which the material holding body is tiltable about a transverse pivot axis at its aft end to dump material out its aft end.

Generally by invention is in the form of a vehicle having a wheel supported chassis which is considerably longer than the material hauling body which it supports, and along which the body can be moved to any desired location intermediate the ends thereof, for advantageously distributing the weight between the front and rear wheels of the vehicle. Additionally the body can be moved to the extreme rear end of the chassis and raised to an inclined position to dump material from its aft end. The invention includes a single extensible and retractable operator controlled power unit capable of moving the body in both directions along the chassis to selected positions, also capable of moving the body to dumping position at the aft end of the chassis, of raising the body to an inclined position to dump its contents from its aft end, and of lowering the body and returning it to a normal load carrying position intermediate the ends of the chassis.

The maximum load laws of most of our states provide that no ground wheel may support greater than a specified weight. If the body of a vehicle is located nearer its rear wheels, then each rear wheel must carry a much greater proportion of the total weight of the material being hauled than the front wheels. Thus the total load which can be hauled in the body is severely limited. By being able to move the body along the chassis, the body load can be equally distributed between the front and rear wheels of the vehicle. Thus a much greater total load can be carried without exceeding the maximum permitted load on any one wheel. Furthermore, when increased drive wheel traction is needed, the above described construction permits the temporary shifting of the load to increase the weight carried by the drive wheels, thus increasing their traction.

A primary object of my invention is to provide a highly simplified construction and mechanism for movably mounting the body on the chassis, for moving the body fore and aft thereon, for raising it to dump its load, and for returning the body to its load carrying location.

Other objects and advantages will be evident when the following description is read in connection with the accompanying drawings, in which:

FIG. 1 is a side elevation of a wheeled chassis supporting a body which is movable longitudinally thereon, together with means for moving the body and for dumping it, parts being broken away for clarity, broken lines showing various possible movement of the various parts;

FIG. 2 is a rear end view of the vehicle shown in FIG. 1, the connecting structure between the rear ground wheel truck and the chassis frame being omitted for clarity in illustrating the chassis construction;

FIG. 3 is a fragmentary view, inside elevation, of a mechanism for locking the body in selected locations intermediate the ends of the chassis, parts being cut away and parts shown in section for clarity;

FIG. 4 is a fragmentary view showing the body locking mechanism in top plan;

FIG. 5 is a transverse vertical sectional view through a portion of the chassis and body showing the body locking mechanism in front elevation;

FIG. 6 is a transverse view, with parts in section showing the transverse pivot mounting of the lower end of a body actuating extensible power unit on the chassis frame;

FIG. 7 is a foreshortened view of the body, with parts broken away and in section, illustrating a preferred manner of mounting the body on the chassis frame for guided longitudinal movement thereon, and also illustrating certain details in the construction of a separable transverse hinge means which affords tilting of the body about a fixed pivot axis at the aft end of the chassis;

FIG. 8 is a fragmentary rear elevation of the hinge means at the aft ends of the body and chassis;

FIG. 9 is a fragmentary transverse sectional view showing additional details of the body mounting structure; and FIG. 10 is a schematic view of a hydraulic system for operating the body actuating extensible power unit.

General Chassis and Body Construction

Referring to the drawings, that embodiment of my invention disclosed includes a vehicle chassis, designated as a whole by the numeral 12 (FIG. 1) and supported by ground wheel trucks 26 and 28. The chassis supports a material carrying body 16, which is considerably shorter in length than the chassis 12, and which is capable of being moved longtiudinally along the chassis to various selected locations.

Chassis 12 includes a heavy frame made up of spaced parallel longitudinally disposed side rails 44 and 46 (FIG. 6) in the form of I-section beams, with suitable cross braces 14 (FIGS. 2 and 4), having their ends welded or otherwise rigidly secured thereto for rigidity.

Body 16 is of conventional four walled rigid construction save that it includes an upwardly inclined longitudinally disposed central tunnel 18 (FIG. 1) which extends from a point intermediate its ends to its forward end wall. The body includes spaced parallel longitudinally disposed side beams 42 and 43 (FIG. 5), channel section cross beams 76 (FIG. 7) which are secured to the side beams and to the body floor or bottom 20, and laterally disposed gussets 78 (FIG. 8) welded or otherwise rigidly secured to the webs of the beams 76, and to the opposite channel section body side beams 42 and 43.

Body Mounting on Chassis

As seen in FIGS. 9 and 7, spaced rigid brackets 80 are secured to the under surface of body floor 20, and journal fore and aft aligned rollers 82, which are mounted at spaced intervals along both sides of the body, and which are spaced laterally to roll on the upper flanges 84 of the chassis side rails 44 and 46.

In addition the side edges of the body carry longitudinally spaced guide rollers 136 journaled on vertically disposed spindles 142, the ends of which are held in fixed position by the upper flange 143 (FIG. 9) of body side beams 42 and 43, and by plates 144 welded to the webs of the side rails 42, as shown in FIG. 9. The peripheries of rollers 136 project through openings 140 cut in the webs of the side rails. The two rows of rollers 136 along opposite sides of the body 16 are spaced to engage the respective outside edges of the flanges 84 of the chassis side rails 44, and thus serve to guide the body and prevent its lateral displacement as it is rolled along the chassis frame.

Body Locking Mechanism

FIGS. 1, 3, 4 and 5 illustrate a mechanism for releasably locking the body in selected locations between the ends of chassis 12, and for automatically locking the body in a preselected location as it is returned from a load dumping operation at the aft end of the chassis.

This mechanism includes a series of longitudinally spaced through perforations 74 in each of the body side beams 42 and 43, respective perforations being transversely aligned. It also includes a pair of opposed lock pins 56 and 58 reciprocable in transversely aligned tubular guides 57 and 59 which are welded or otherwise rigidly secured in the respective chassis side rails 44 and 46 at a level to afford registry of the respective lock pins with the apertures in the respective body side beams.

Pins 56 and 58 are urged toward an outwardly projected or body locking position by springs 70 and 71, anchored respectively to fixed guides 57 and 59 and to pin retracting links 64 and 65. These links are pivotally connected to the respective locking pins by pivot pins 66 and 67. The opposite ends of links 64 and 65 are pivotally connected by diametrically opposite pins 68 and 69 to a retracting lever 52, which is itself pivotally mounted at 73 on a chassis cross brace 14. Slots 75 and 77 in the links 64 and 65 afford limited outward movement of links 64 and 65, independent of the lever 52, when it is in the solid line position shown in FIG. 5.

The free end of lever 52 is pivotally connected at 50 to a pull rod 38, the outer end of which projects outwardly through an aperture in chassis side rail 44. Rod 38 carries a fixed latch pin 48 adapted to lift and be held by the notched inner end of a latch bolt 96 which is pivotally connected at 98 to chassis side rail 44. A sufficiently large aperture in this side rail affords free movement for latch bolt 96, and allows its outer end to project outwardly from the rail 44 into the path of travel of a trip lever 94 (FIGS. 3 and 5).

With the various parts in their full line positions of FIG. 5 pins 56 and 58 are seated in an aligned pair of apertures 74 in the body side beams 42 and 43, and the body is thereby locked against relative longitudinal movement along the chassis 12. A manual pull outward on rod 38 retracts pins 56 and 58 simultaneously, and latch bolt 96 receives and holds latch pin 48, thus holding all parts in their broken line positions with the pins retracted and the body 16 free to move along the chassis 12.

*Automatic Body Locking at Pre-Selected Location*

As a means of automatically again locking the body in a preselected location intermediate the ends of the chassis, I provide the latch tripping lever 94 (FIG. 3), which is pivotally mounted at 92 on a slide 86. This slide is slidably mounted for longitudinal position adjustment on a rod or tube 88 welded to the nether surface of the lower flange of body side beam 42 (FIG. 5). A set screw having an integral handle 40 is threaded through the wall of slide 86 and engages the adjacent surface of rod 88 to lock the slide in a selected location thereon.

Trip lever 94 is so mounted and constructed as to have movement only between the solid line and broken line positions shown in FIG. 3. Due to gravity it normally occupies the position shown in solid lines. In this position it travels with the body 16 in a path to contact and release latch bolt 96 from its holding contact with latch pin 48, thus freeing the lock pins 56 and 58 to the action of springs 70 and 71, which then projects the pins outward to seat in apertures 74 in the body side beams.

*Separable Hinge for Body Dumping*

Referring now particularly to FIGS. 1, 7 and 8, the aft ends of the body and chassis respectively carry cooperating separable and lockable hinge or pivot means to afford tilting and dumping of the body on a fixed hinge or pivot axis.

At its aft end each of the body side beams 42 and 43 rigidly carries laterally spaced heavy plates 120 and 122, all four of which are provided with rearwardly opening transversely aligned slots 124. When the body 16 is moved rearwardly on the chassis these slots 124 receive and engage the opposite end portions of a transversely disposed shaft 116 carried rigidly by the two chassis side rails 44 and 46, thus creating a fixed pivot axis about which the body may be tilted.

To obviate possible separation of the hinge pin shaft 116 from the slots in the plates 120 and 122 during the body dumping operation, I provide gravity actuated locks for each end of shaft 116 in the form of dogs 128, one pivoted between each pair of plates 120 and 122 on a pivot pin 130 passing through the plates at a location aft and slightly above the longitudinal axis of the slots 124. A cross bar 129 (FIG. 8) welded in position between the plates 120 and 122 with its upper end lying just outside the lower walls of slots 124, serves as a limit stop to limit the downward pivotal movement of dogs 128 to the position shown in solid lines in FIG. 7.

Thus when the body is moved aft into dumping position on the chassis the ends of shaft 116 contact the inclined edges of dogs 128, pivot the dogs upward to clear slots 124, and when the shaft ends assume the positions shown in broken lines 116a in FIG. 7, the dogs 128 drop into their solid line positions, locking shaft 116 within the slots 124.

A dog release lever 132 is pivoted on a pivot pin 133 between each pair of plates 120 and 122. When it is pivoted manually upward from its solid line position in FIG. 7 to its broken line position 132A, it contacts the inclined edge of dog 128 and moves the dog upward to clear slot 124 to permit the body to be moved forward on the chassis.

*Body Moving Power Unit*

Referring now to FIG. 1, my invention includes a double acting, operator controllable longitudinally extensible and retractable power unit for moving the body forward or aft to selected positions on the chassis, for moving the body aft until the separable hinge means have engaged each other, for moving the body about its hinge into a rearwardly inclined position to dump material therefrom, for lowering the body onto the chassis side rails after the dumping operation, and for then returning the body to a selected position intermediate the ends of the chassis.

In the drawings, this power unit is illustrated as a double acting hydraulic working cylinder 22 made up of a plunger rod and a plurality of inter-telescoping sections, as shown.

The rod end of the cylinder is mounted on a transverse pivot 106 (FIG. 6), the ends of which are welded to the lower flanges 104 of the chassis side rails 44 and 46. Pivot 106 is additionally supported by gussets 110 and 112, or in any other suitable manner.

The opposite end of the cylinder is pivotally connected to the forward end of the body 16 on a transverse pivot axis 107, FIG. 1.

The fore and aft distance between the body dumping fixed hinge pin 116 on the chassis and the fixed cylinder pivot axis 106, also on the chassis, is less than the fore and aft distance between the closed end of the body hinge slot 124 and the cylinder pivot axis 107 at the front end of the body. Thus when the body is seated on its rollers on the chassis in horizontal position, cylinder pivot axis 107 is always forward of cylinder pivot axis 106, regardless of the relative fore or aft position of the body on the chassis.

*Operation*

With the body locked in horizontal position on the chassis, as shown in FIG. 1, the operator first pulls pull rod 28 (FIG. 5) outward until latch pin 48 is contacted and held by latch bolt 96. This movement retracts lock pins 56 and 58 from their respective seats 74 in the two body side rails, and frees the body for movement along the chassis. In case the vehicle is on an incline at the time of this unlocking operation, it is prevented by cylinder 22 from gravitating toward either end of the chassis, until the cylinder is actuated by manipulation of a lock-out type control valve 148, included in the simple hydraulic system illustrated in FIG. 10.

Next, the operator operates control valve 148 in a direction to reduce the length of cylinder 22, thus forcing the body to the aft end of the chassis until the separable hinge means (124 and 116), previously described, engage and automatically lock together.

Valve 148 is then operated to increase the length of cylinder 22, thus lifting the forward end of the body until the body assumes the desired inclination, as shown by the broken line position of the body in FIG. 1 (16a).

After completion of the dumping operation, valve 148 is operated to reduce the length of cylinder 22, thus lowering the body 16 until it rests on its rollers 82 on the top flanges of the chassis side rails 44 and 46.

The operator then pivots the dog release levers 132 at each side of the chassis upward to clear both slots 124, thus unlocking the separable hinge means so that the body can be moved forward.

The operator then operates valve 148 to lengthen the cylinder 22 and the cylinder thus moves the body forward on the chassis 12.

During forward movement of the body, trip lever 94 (FIG. 3) contacts holding latch bolt 96 and pivots that latch to release its hold on latch pin 48. This releases the body locking mechanism to the action of springs 70 and and 71, which instantly project lock pins 56 and 58 outward (FIG. 5) to seat in the respective adjacent perforations 74 in the opposite body side beams 42 and 43, thus automatically locking the body in a fixed position on the chassis. It will be understood that slide 86 can be moved forward or aft to any desired location on its rod 88, in order to select the relative position on the chassis at which the body will automatically be stopped and locked.

Having described the invention with sufficient clarity to enable those familiar with this art to construct and use it, I claim:

1. A load carrying and dumping vehicle comprising:
    an elongated wheel supported chassis;
    a load carrying and dumping body which is shorter in length than said chassis;
    means mounting the body on the chassis for guided longitudinal movement therealong;
    one double acting operator controllable longitudinally extensible and retractable power unit having its aft end connected to the chassis intermediate its ends on a transverse pivot axis, and having its forward end connected to the forward end of the body on a transverse pivot axis;
    and separable cooperating pivot means carried respectively by the aft end of the body and by the aft end of the chassis for automatically establishing a transverse body dumping pivot axis for the aft end of the body when the body is moved rearwardly a sufficient distance along the chassis to bring the cooperating pivot means together,
    and for maintaining the pivot axis during the pivotal movement of the body, said pivot means being releasable so that the body may be moved relative to the chassis,
    the distance between the body pivot means on the aft end of the chassis and the pivot axis on the chassis for the aft end of the said power unit being less than the distance between the pivot means carried by the aft end of the body and the pivot axis on the body for the forward end of the said power unit;
    whereby when the body is located in a load carrying intermediate position on the chassis, a first retraction of the power unit will move the body aft to a position in which the body dumping pivot axis is established, a subsequent elongation of the power unit will then raise the forward end of the body above the chassis to dump the load from the aft end thereof, a subsequent second retraction of the power unit will lower the body back to its normal position on the chassis, and upon releasing of the pivot means a subsequent second elongation of the power unit will move the body forward on the chassis to its original load carrying position.

2. The vehicle described in claim 1, and cooperating means carried respectively by the chassis and by the body for releasably locking the body in selected intermediate load carrying positions on the chassis.

3. The vehicle described in claim 2 in which the body locking mechanism includes a transversely reciprocable outwardly spring pressed lock pin mounted on the chassis;
    lock pin receiving apertures in an adjacent portion of the body;
    means operable manually to retract the lock pin from an aperture in which it may be seated;
    latch means on the chassis for holding the pin in its retracted position;
    and longitudinally adjustable trip means carried by the body for tripping the latch means when the body moves to a preselected position on the chassis, to release the lock pin to seat in an adjacent one of said apertures.

4. The vehicle described in claim 1 in which the double acting longitudinally extensible and retractable power unit is a multiple section hydraulically actuated working cylinder or ram.

5. The vehicle described in claim 1 in which the separable cooperating pivot means for the body includes laterally spaced heavy plates fixed to the aft end of the body in vertical parallel planes, the aft ends of said plates having transversely aligned slots therein, one in each plate, longitudinally disposed and open at their respective aft ends;
    a transverse rod rigidly carried by the aft end of the chassis in a position to enter the slots in said plates when the body is moved a sufficient distance aft on said chassis;
    and a gravity actuated dog pivotally mounted on each plate adjacent its slot to afford entry of the rod into said slot, and to prevent withdrawal of the rod therefrom until the dog is manually displaced from blocking the open end of the slot.

6. A load carrying and dumping vehicle comprising:
    a weight supporting chassis which includes two parallel cross braced longitudinally disposed side rails supported on wheel trucks at opposite ends;
    a material holding body supported on the chassis side rails on rollers and movable longitudinally along the chassis in both directions;
    cooperating separable and lockable transverse hinge means carried by the aft end of the body and by the aft end of the chassis affording tilting of the body to dump material from the aft end thereof over the aft end of the chassis;
    and an extensible double acting hydraulic cylinder having one end pivotally connected on a transverse pivot axis to the chassis intermediate its ends, the other end of the cylinder being pivotally connected to the forward end of the body, the distance between the cylinder pivot axis on the chassis and the axis of said hinge means at the aft end of the chassis being less than the distance between the hinge means at the aft end of the body and the cylinder pivot axis at the forward end of the body, whereby the single cylinder serves to move the body to the aft end of the chassis, to raise it into a rearwardly inclined position to dump its load, to lower it back onto the chassis, and to move it forward to a selected load carrying position intermediate the ends of the chassis.

References Cited in the file of this patent

UNITED STATES PATENTS

| | | |
|---|---|---|
| 2,189,052 | Anthony | Feb. 6, 1940 |
| 3,022,111 | Hutchinson | Feb. 20, 1962 |